United States Patent [19]
Fujiki et al.

[11] Patent Number: 5,107,380
[45] Date of Patent: Apr. 21, 1992

[54] ROTARY HEAD TYPE RECORDING OR REPRODUCING APPARATUS DETECTING THE SLACK OF THE RECORDING MEDIUM

[75] Inventors: Makoto Fujiki; Junji Kobayashi; Hidetoshi Matsuoka, all of Tokyo; Osamu Nagatsuka, Kanagawa; Hiroo Edakubo, Kanagawa; Toshihiko Nakajima, Kanagawa, all of Japan

[73] Assignee: Canon Kabushiki Kaisha, Tokyo, Japan

[21] Appl. No.: 450,616

[22] Filed: Dec. 14, 1989

[30] Foreign Application Priority Data

Dec. 19, 1988 [JP] Japan .................. 63-319938

[51] Int. Cl.$^5$ .................. G11B 15/093; G11B 21/02
[52] U.S. Cl. .................. 360/69; 360/71; 360/75
[58] Field of Search .................. 360/84, 69, 71, 75

[56] References Cited

U.S. PATENT DOCUMENTS 4,390,909  6/1983  Sakamoto .................. 360/71
4,396,956  8/1983  Hedlund .................. 360/71
4,688,115  8/1987  Takahashi et al. .................. 360/70
4,930,024  5/1990  Kanda et al. .................. 360/10.3

Primary Examiner—Robert S. Tupper
Attorney, Agent, or Firm—Robin, Blecker, Daley & Driscoll

[57] ABSTRACT

A rotary head type recording or reproducing apparatus of the type in which the recording or reproduction of signals is effected by tracing a recording medium transported in a predetermined direction with rotary heads in a direction which is at less than 90° with respect to this predetermined direction. The apparatus is provided with a rewinding mode in which the above-mentioned recording medium is transported in a direction reverse to the above-mentioned predetermined direction without performing the recording or reproduction of signals, with the rotary heads being in the condition where they can trace the recording medium. In this rewinding mode, the rotary heads are rotated in a direction reverse to their rotating direction during the recording or reproduction of signals.

6 Claims, 4 Drawing Sheets

ROTARY HEAD TYPE RECORDING OR REPRODUCING APPARATUS DETECTING THE SLACK OF THE RECORDING MEDIUM

BACKGROUND OF THE INVENTION

1. Field of the Invention

This invention relates to a rotary head type recording or reproducing apparatus and, in particular, to an apparatus in which a recording medium is rewound while tracing the recording medium with rotary heads.

2. Description of the Related Art

Conventionally, the tape path of a video tape recorder (VTR) using a standard-diameter drum, i.e., of a two-head helical scan VTR, in which the tape is wound around the drum over an angular range of 180° or more, has been provided with a relatively large degree of flexibility in regard to its size and space. This large degree of freedom has made it possible to keep the tape winding angle as small as possible with respect to the guide posts for guiding the tape and to leave a space of some extent between the drum and the guide posts.

FIG. 1 shows an example of the tape path of a conventional VTR of this type. The VTR shown includes a standard rotating drum 1 having a plurality of rotary heads, a tape housing cassette 2, a tape 3, a tension post 4 for controlling the tape tension, and guide posts 5, 6, 7, 8, 9 and 11 for guiding the tape. The reference numeral 10 indicates a capstan, against which a pinch roller 12 is pressed with the tape 3 sandwiched therebetween, which is adapted to transport the tape 3 in a longitudinal direction thereof. During normal recording or reproduction, the drum 1 rotates in the direction indicated by an arrow 13, and the tape 3 runs in the direction indicated by an arrow 14. Thus, the running of the tape and the tracing of the same by the rotary heads are effected substantially in the same direction, although their track inclination angles with respect to the longitudinal direction of the tape differ from each other.

When rewinding the tape at a high speed, the rotating direction of the capstan 10 is reversed, the tape being transported from a take-up reel 16 and taken up by a supply reel 15.

Now, with a view to reducing the size and weight of VTRs, a VTR having a small-diameter drum has recently been produced on a commercial basis. In this VTR, the drum diameter is ⅔, and the tape winding angle with which it is wound around the drum is 3/2, in comparison to the prior art. The drum of this VTR is equipped with four rotary heads exhibiting a phase difference of 90° with respect to each other.

In a VTR using such a small diameter drum, the number of guide posts arranged between the supply reel and the capstan is inevitably large, so that tension loss due to the guide posts cannot be avoided. In addition, since the tape is wound around the drum over a wide angular range, the guide posts are arranged very close to the small diameter drum, the gap secured between them being as small as about 0.1 to 0.2 mm. As a result, it is difficult for the tape to run in a stable manner. Moreover, since the tape is wound around the drum over a wide angular range in a small diameter, the amount of air film on the drum is smaller in comparison to that of the above-mentioned usual drum.

In the case of a VTR employing a standard-diameter drum as described above, the tape winding angle on the drum is not so large, and an air lubricating layer, i.e., a so-called air film, is formed to a sufficient degree between the rotating drum and the tape. In addition, the winding angle around the guide posts is relatively small, so that the tape can be taken up by the supply reel.

However, in the case of a VTR using a small-diameter drum as described above, a problem occurs when rewinding the tape at a high speed by reversing the capstan: namely, it is very difficult for the tape transported by the capstan to be taken up in the normal manner by the supply reel.

That is, the tape becomes loose between the capstan and the drum, which makes it likely that the tape will be damaged. This tendency is particularly conspicuous in a tape which has been used for a long time. Any damage in the tape edge section results in an increased tension loss on the guide posts and the drum, causing an excessively defective take-up of the tape.

SUMMARY OF THE INVENTION

This invention has been made in view of the above problem experienced with the prior art. It is accordingly an object of this invention to provide a rotary head type recording or reproducing apparatus which allows a recording medium in the form of a tape to be rewound smoothly.

Another object of this invention is to provide a rotary head type recording or reproducing apparatus which can be made smaller and lighter and which makes it possible for a recording medium in the form of a tape to be rewound at a high speed in a stable manner.

In order to achieve these objects, this invention provides as an embodiment thereof a rotary head type recording and/or reproducing apparatus, comprising: transporting means for transporting a recording medium; a rotary head for recording and/or reproducing signals on and/or from the above-mentioned recording medium; and mode switching means for switching the apparatus between a plurality of modes, the plurality of modes including: a first mode in which the above-mentioned transporting means transports the above-mentioned recording medium at a first speed and the above-mentioned rotary head records and/or reproduce signals while rotating in a predetermined direction; and a second mode in which the above-mentioned transporting means transports the above-mentioned recording medium at a second speed that is higher than the above-mentioned first speed and the above-mentioned rotary head rotates in a direction reverse to the above-mentioned predetermined direction.

Other objects and features of this invention will become apparent upon a reading of the following detailed description together with reference to the accompanying drawings.

DETAILED DESCRIPTION OF THE PREFERRED EMBODIMENTS

The embodiments of this invention will now be described.

Figure 1:
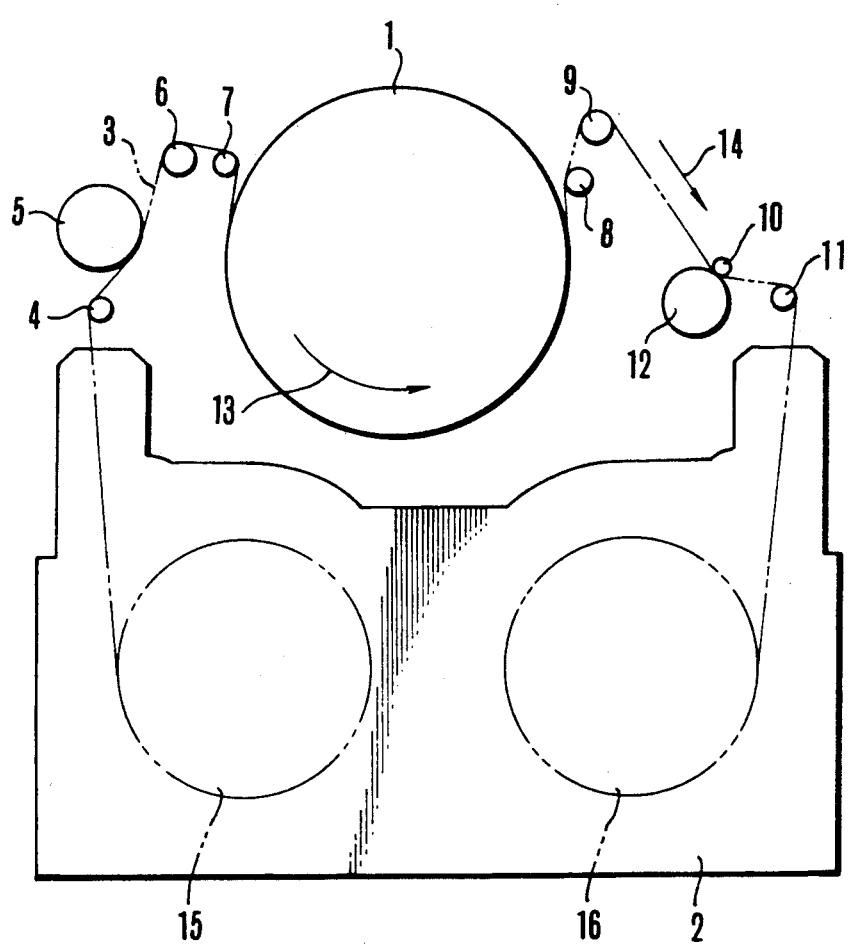
FIG. 1 shows the tape path of a conventional VTR.
Figure 3:
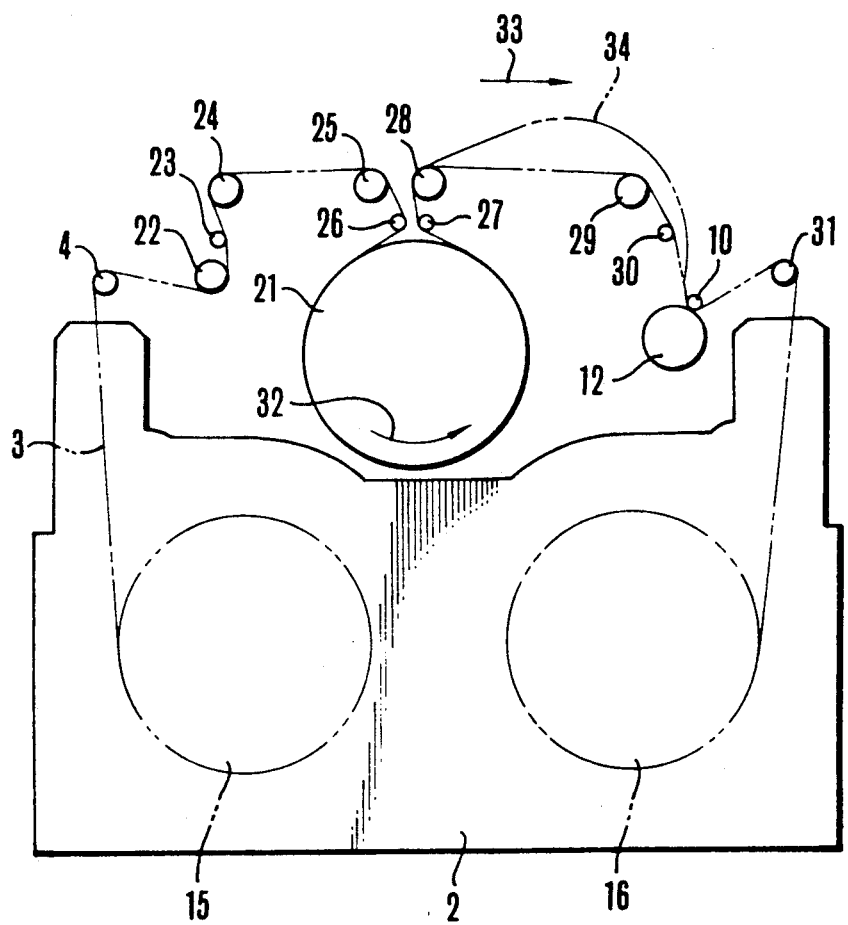
FIG. 3 is a schematic view showing the tape path of the VTR shown in FIG. 2.

In FIG. 3, the components similar to those of FIG. 1 are referred to by the same reference numerals. As shown in FIG. 3, in the VTR of this embodiment, the tape 3 is wound around a drum 21 over an angular range of 330° or more. The reference numeral 21 indicates a small-diameter rotating drum and 22 to 31 indicate guide posts for guiding the tape. During normal recording or reproduction, the small-diameter rotating drum 21 rotates in the direction indicated by an arrow 32 at a speed 3/2 times higher than the standard drum shown in FIG. 1. As for the tape 3, it is caused to run at a fixed speed in the direction indicated by the arrow 33 by the capstan 10 and the pinch roller 12.

Figure 2:
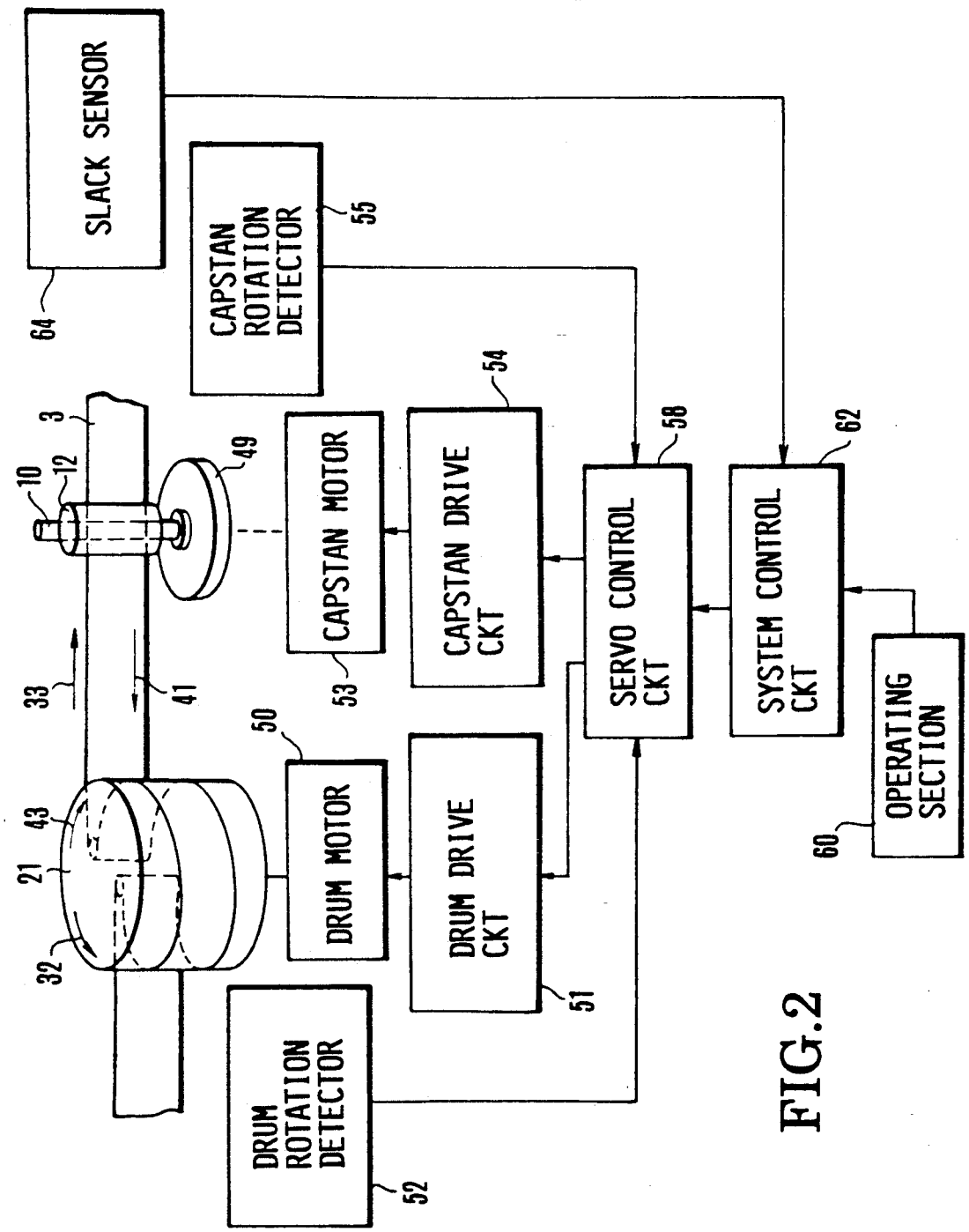
FIG. 2 is a block diagram showing the system configuration of a VTR constituting an embodiment of this invention.

Referring to FIG. 2 the VTR system shown includes a drum motor 50, a drum drive circuit 51 for driving the drum motor 50, drum rotation detector 52 for detecting the rotation of the drum 21 to generate a frequency signal (drum FG), a capstan motor 53, a capstan drive circuit 54 for driving the capstan motor 53, and a capstan rotation detector 55 for detecting the rotation of the flywheel 49 of the capstan 10 to generate a frequency signal (capstan FG). During normal recording or reproduction, the drum drive circuit 51 and the capstan drive circuit 54 are controlled by a servo control circuit 58 in such a manner that they cause the drum 21 and the capstan 10 to rotate at predetermined speeds in the directions indicated by the arrows 32 and 33, respectively. That is, the servo control circuit 58 supplies speed control signals to the drum drive circuit 51 and the capstan drive circuit 54 such that the respective frequencies of the capstan FG and drum FG mentioned above are kept constant.

An operating section 60 is used when the user designates the operation mode. A system control circuit 62 determines the mode of the servo control circuit 58 in accordance with the mode designated by the user at this operating section 60.

When a high-speed rewinding mode is designated through the operating section 60, the capstan drive circuit 54 is controlled by the servo control circuit 58 such that the tape 3 runs at a high speed in the direction indicated by an arrow 41. At the same time, a mechanism (not shown) causes the supply reel 15 to rotate with a constant torque in the direction in which the tape 3 is taken up.

Normally, the drum 21 rotates in the same direction as in normal recording or reproduction (as indicated by the arrow 32). If, in this high-speed rewinding mode, a slack sensor 64 detects the slack of the tape as indicated at 34 in FIG. 3, the servo control circuit 58 controls the rotation of the capstan 10 in response to a command from the system control circuit 62, lowering, for a predetermined period, the speed at which the tape 3 is transported. At the same time, the drum 21 is rotated in the reverse direction (indicated by an arrow 43). Then, after this predetermined period, the capstan 10 is rotated at a high speed again, resuming the high-speed rewinding of the tape while allowing the drum 21 to continue to rotate in the reverse direction.

The slack sensor 64 can be formed by arranging a photoreflector or the like on the tape path between the capstan 10 and the drum 21.

With the above-described construction, tension loss of the tape, which is wound around the drum 21 over a wide angular range, can be avoided since the tape running direction during high-speed rewinding is approximated to the drum rotating direction by reversing the rotation of the drum 21. Moreover, the running of the tape can be promoted by the rotating drum 21 As a result, the tape can be easily taken up by the supply reel 15 and no tension loss on the drum 21 occurs, so that the slack of the tape between the capstan 10 and the drum 21 can be avoided.

Figure 4:
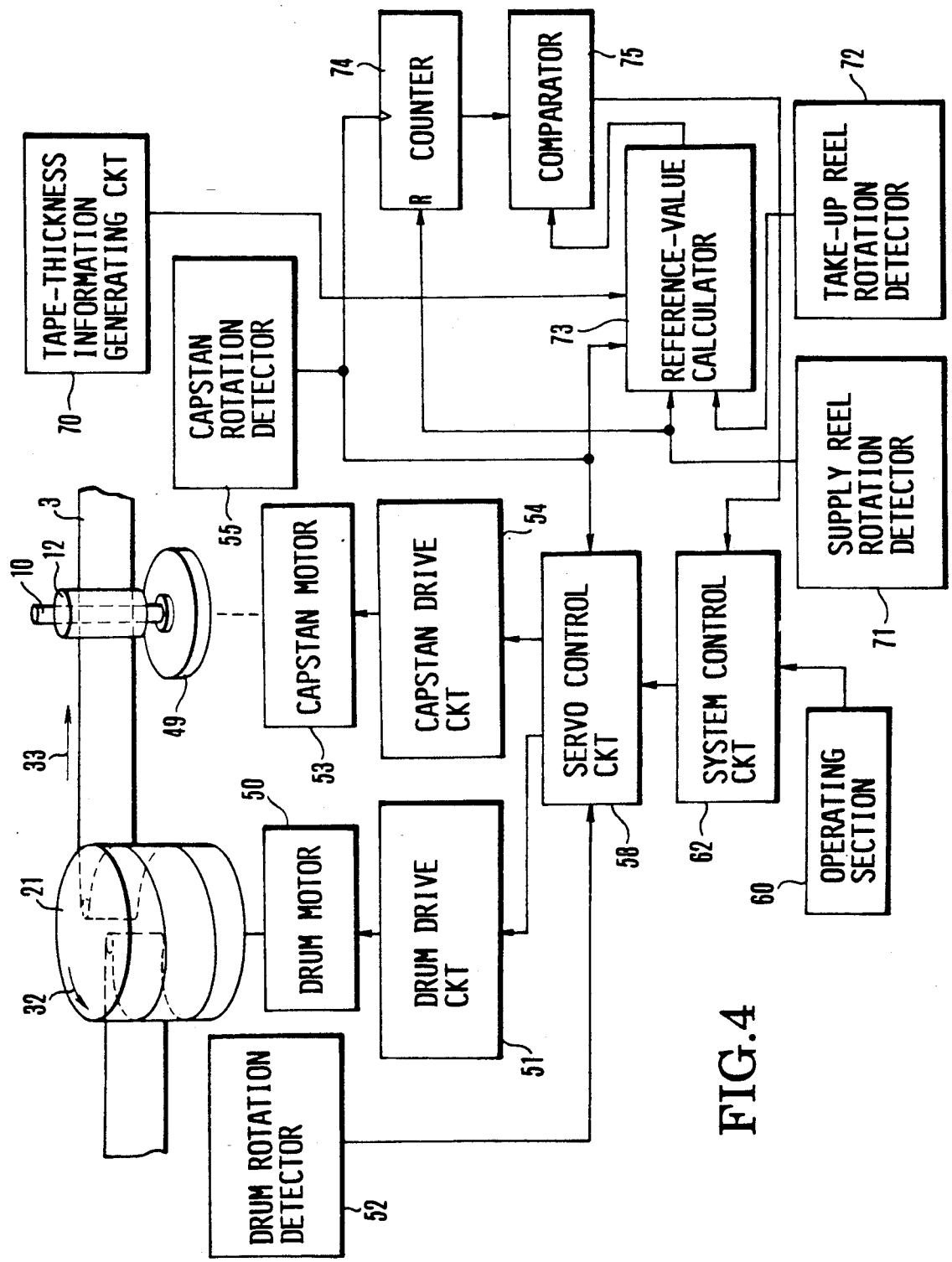
FIG. 4 is a block diagram showing the system configuration of a VTR constituting another embodiment of this invention.

FIG. 4 shows the system configuration of a VTR constituting another embodiment of this invention. In the drawing, the components similar to those of FIG. 2 are referred to by the same reference numerals. The VTR of this embodiment differs from that of FIG. 2 in the construction of the means for detecting the slack of a tape.

The system shown includes a tape-thickness information generating circuit 70 adapted to generate information on the thickness of the tape 3 by, for example, detecting holes provided in the cassette 2, a rotation detector 71 for detecting the rotation of the supply reel 15 to generate a frequency signal (S-reel FG), and a rotation detector 72 for detecting the rotation of the take-up reel 16 to generate a frequency signal (T-reel FG).

A counter 74 is reset upon receipt of each pulse of the S-reel FG, counting the number of capstan FG during the interval. A comparator 75 compares the count number with a reference value generated by a reference-value calculator 73. When the count number is larger than the reference value, the comparator 75 outputs a control signal indicative of a defective take-up of the tape. The tape rewinding speed is then lowered temporarily, as in the above-described embodiment, and the rotation of the drum 21 is reversed, resuming the high-speed rewinding of the tape after a predetermined period. The fact that the capstan FG is larger than the reference value indicates that take-up by the supply reel 15 is delayed with respect to the tape 3 transported by the capstan 10. The counter 74 is reset upon receipt of each pulse of the S-reel FG, counting the capstan FG upon each pulse of the S-reel FG.

The above-mentioned reference value can be varied appropriately in accordance with the frequency of the capstan FG, so that the tape slack can also be monitored during the mode transition to the high-speed rewinding operation. In addition, by supplying the S-reel FG, the T-reel FG, and the tape-thickness information, the winding diameter can be known and a reference value in accordance with the winding diameter can be established, thereby making it possible to quickly cope with any defective operation.

While in the above embodiments the drum is rotated in a direction reverse to the normal direction when a trouble occurs during high-speed rewinding, it goes without saying that the drum can be rotated in the reverse direction at the start of the high-speed winding. However, reversing the drum when a trouble occurs is advantageous in that no reciprocal rotation is involved in the normal use condition, thus avoiding time loss when the mode is shifted from the normal recording or reproduction mode or the high-speed reproduction mode to the tape rewinding mode.

As described above, this invention makes it possible to provide a rotary head type recording or reproducing apparatus which can be made smaller and lighter than in the prior art and which allows a recording medium in the form of a tape to be rewound at a high speed in a stable manner.

What is claimed is:

1. A rotary head type recording and/or reproducing apparatus, comprising:
   a) transporting means for transporting a recording medium;
   (b) a rotary head for recording and/or reproducing signals on and/or from said recording medium;
   (c) mode switching means for switching said apparatus between a plurality modes,
   said plurality of modes including:
   a first mode in which said transporting means transports said recording medium in a first direction at a predetermined speed and said rotary head records and/or reproduces signals while rotating in a predetermined direction;
   a second mode in which said transporting means transports said recording medium in a second direction which is reverse to said first direction at a speed that is higher than said predetermined speed and said rotary head rotates in a direction reverse to said predetermined direction; and
   a third mode in which said transporting means transports said recording medium in said second direction at a speed that is higher than said predetermined speed and said rotary head rotates in said predetermined direction; and
   (d) slack detecting means for detecting the slack of said recording medium, said mode switching means switching said apparatus from said third mode to said second mode in response to the output of said slack detecting means.

2. An apparatus according to claim 1, wherein said rotary head does not perform the recording and/or reproduction of signals in said second and third modes.

3. An apparatus according to claim 1, wherein in said first and third modes said rotary head rotates in a direction which is at less than 90° with respect to a transporting direction of said transporting means.

4. An apparatus according to claim 1, wherein said slack detecting means includes means for detecting the rotation of a reel around which said recording medium in the form of a tape is wound, and means for detecting a transporting operation of said transporting means.

5. An apparatus according to claim 1, wherein said plurality of modes further includes a fourth mode in which said transporting means transports said recording medium in said second direction at a speed that is slower than that in said third mode and said rotary head rotates in the direction reverse to said predetermined direction, and wherein said mode switching means sets said apparatus in said second mode after setting said apparatus in said fourth mode for a predetermined period of time.

6. A rotary head type recording and/or reproducing apparatus, comprising:
   (a) transporting means for transporting a recording medium;
   (b) a rotary head for recording and/or reproducing signals on and/or from said recording medium;
   (c) mode switching means for switching said apparatus between a plurality of modes,
   said plurality of modes including:
   a first mode in which said transporting means transports said recording medium in a first direction at a predetermined speed; and
   a second mode in which said transporting means transports said recording medium in a second direction which is reverse to said first direction at a speed that is higher than said predetermined speed;
   (d) slack detecting means for detecting the slack of said recording medium while said apparatus is set in said second mode; and
   (e) rotating direction reversing means for reversing a rotating direction of said rotary head in response to the output of said slack detecting means.

* * * * *